United States Patent
Park (10) Patent No.: US 7,729,208 B2
(45) Date of Patent: Jun. 1, 2010

(54) RECORDING MEDIUM, AND METHOD AND APPARATUS FOR REFORMATTING THE SAME

(75) Inventor: Yong Cheol Park, Gwachon-si (KR)

(73) Assignee: LG Electronics, Inc., Seoul (KR)

( * ) Notice: Subject to any disclaimer, the term of this patent is extended or adjusted under 35 U.S.C. 154(b) by 1001 days.

(21) Appl. No.: 11/155,485

(22) Filed: Jun. 20, 2005

(65) Prior Publication Data

US 2005/0281167 A1 Dec. 22, 2005

Related U.S. Application Data

(60) Provisional application No. 60/580,729, filed on Jun. 21, 2004.

(30) Foreign Application Priority Data

May 24, 2005 (KR) ...................... 10-2005-0043579

(51) Int. Cl.
*G11B 7/085* (2006.01)
(52) U.S. Cl. .................................. 369/30.03
(58) Field of Classification Search ....................... None
See application file for complete search history.

(56) References Cited

U.S. PATENT DOCUMENTS

| | | |
|---|---|---|
| 5,237,553 A | 8/1993 | Fukushima et al. |
| 5,552,776 A | 9/1996 | Wade et al. |
| 5,815,485 A | 9/1998 | Tanaka et al. |
| 6,115,346 A | 9/2000 | Sims, III |
| 6,351,788 B1 | 2/2002 | Yamazaki et al. |
| 6,526,522 B1 | 2/2003 | Park et al. |
| 6,580,684 B2 | 6/2003 | Miyake et al. |
| 6,621,783 B1 | 9/2003 | Murata |
| 6,691,209 B1 | 2/2004 | O'Connell |
| 6,725,200 B1 | 4/2004 | Rost |
| 6,912,188 B2 | 6/2005 | Morishima |

(Continued)

FOREIGN PATENT DOCUMENTS

EP 0 495 471 A2 7/1992

(Continued)

OTHER PUBLICATIONS

Blu-Ray Disc Association, "Rewritable Blu-Ray Disc (BD-RE) Multi-Media Command Set Description, Version 0.80", [Online] Nov. 9, 2004.

(Continued)

*Primary Examiner*—Joseph H Feild
*Assistant Examiner*—Henok G Heyi
(74) *Attorney, Agent, or Firm*—Harness, Dickey & Pierce, P.L.C.

(57) ABSTRACT

A recording medium, and a method and apparatus for reformatting the recording medium are disclosed. The method for reformatting a recording medium includes the steps of: (a) reading a plurality of physical access control information of the recording medium in a plurality of recording units; and (b) performing an initialization process for each recording unit upon receiving a reformatting command associated with the plurality of recording units,
wherein the initialization process is differently performed according to an attribute of information recorded in each recording unit. Therefore, the PAC area contained in a high-density optical disc can be efficiently reformatted.

27 Claims, 5 Drawing Sheets

U.S. PATENT DOCUMENTS

| | | | |
|---|---|---|---|
| 6,963,523 | B1 | 11/2005 | Park |
| 7,230,893 | B2 * | 6/2007 | Park ................. 369/47.14 |
| 2002/0036643 | A1 | 3/2002 | Namizuka et al. |
| 2002/0078295 | A1 | 6/2002 | Shaath et al. |
| 2002/0136118 | A1 | 9/2002 | Takahashi |
| 2003/0048731 | A1 | 3/2003 | Ozaki |
| 2003/0137915 | A1 | 7/2003 | Shoji et al. |
| 2003/0210627 | A1 | 11/2003 | Ijtsma et al. |
| 2003/0212564 | A1 | 11/2003 | Sawabe et al. |
| 2004/0013061 | A1 | 1/2004 | Wu |
| 2004/0174782 | A1 | 9/2004 | Lee et al. |
| 2004/0174793 | A1 | 9/2004 | Park et al. |
| 2004/0218488 | A1 | 11/2004 | Hwang et al. |
| 2004/0246852 | A1 | 12/2004 | Hwang et al. |
| 2005/0169132 | A1 | 8/2005 | Kuraoka et al. |
| 2005/0195716 | A1 | 9/2005 | Ko et al. |
| 2005/0207318 | A1 | 9/2005 | Park |
| 2007/0053267 | A1 * | 3/2007 | Brondijk ............. 369/53.24 |

FOREIGN PATENT DOCUMENTS

| | | | |
|---|---|---|---|
| EP | 1 061 517 | A1 | 12/2000 |
| EP | 1 251 508 | A2 | 10/2002 |
| EP | 1 329 888 | A1 | 7/2003 |
| EP | 1 381 047 | A1 | 1/2004 |
| EP | 1 505 597 | A1 | 2/2005 |
| EP | 1505597 | | 2/2005 |
| EP | 1 587 102 | A2 | 10/2005 |
| EP | 1587102 | | 10/2005 |
| EP | 1 887 577 | A2 | 2/2008 |
| JP | 06-259886 | | 9/1994 |
| JP | 07-200182 | | 8/1995 |
| JP | 11-039801 | | 2/1999 |
| JP | 2002-015525 | | 1/2002 |
| JP | 2002-124037 | | 4/2002 |
| JP | 2002-278821 | | 9/2002 |
| JP | 2002-328848 | | 11/2002 |
| JP | 2004-030779 | | 1/2004 |
| JP | 2006-313628 | | 11/2006 |
| RU | 2 299 481 | | 5/2007 |
| WO | 03/030173 | | 4/2003 |
| WO | WO 03/030173 | A2 | 4/2003 |
| WO | WO 03/102936 | A1 | 12/2003 |
| WO | WO 2004/001753 | A1 | 12/2003 |
| WO | WO 2004/001754 | A1 | 12/2003 |
| WO | WO 2004/019326 | A1 | 3/2004 |
| WO | WO 2004/081936 | A1 | 9/2004 |
| WO | 2005/086598 | | 9/2005 |
| WO | WO 2005/086598 | A2 | 9/2005 |

OTHER PUBLICATIONS

Search report issued Aug. 4, 2008 by the European Patent Office in counterpart European Patent Application No. 07110264.4-2223.

Search report issued Jul. 30, 2008 by the European Patent Office in counterpart European Patent Application No. 07150328.8-2223.

Office Action issued Sep. 3, 2008 by the USPTO in counterpart U.S. Appl. No. 11/085,134.

"120 mm DVD Rewritable Disk (DVD-RAM)", ECMA Standardizing Information and Communication Systems, Standard ECMA-272, $2^{nd}$ Edition, Jun. 1999.

Office Action issued Aug. 25, 2009 by the Japanese Patent Office in counterpart Japanese Patent Application No. 2007-517947 (with English language translation).

Office Action issued Jul. 22, 2009 by the Russian Patent Office in counterpart Russian Patent Application No. 2007102062/28 (with English language translation).

Office Action issued Jul. 16, 2009 by the Russian Patent Office in counterpart Russian Patent Application No. 2007102063/28 (with English language translation).

Search Report issued Jun. 2, 2009 by the European Patent Office in European Patent Application No. 09151219.4-2210.

U.S. Patent Office Action dated May 13, 2008, for U.S. Appl. No. 11/061,665.

European Patent Office Action dated May 14, 2008, for European Patent Application No. 04808643.3-2223.

European Patent Office Search Report dated May 15, 2008, for European Patent Application No. 07111355.9-2223.

* cited by examiner

RECORDING MEDIUM, AND METHOD AND APPARATUS FOR REFORMATTING THE SAME

This application claims the benefit of U.S. Provisional Application No. 60/580,729, filed on Jun. 21, 2004, in the name of inventor Yong Cheol PARK, entitled "PAC REFORMATTING IN BD-RE", which is hereby incorporated by reference as if fully set forth herein.

This application claims the benefit of Korean Patent Application No. 10-2005-0043579, filed on May 24, 2005, which is hereby incorporated by reference as if fully set forth herein.

BACKGROUND OF THE INVENTION

1. Field of the Invention

The present invention relates to a recording medium, and a method and apparatus for reformatting the recording medium, and more particularly, to a method for reformatting a specific management area contained in the recording medium.

2. Discussion of the Related Art

Generally, there has been widely used an optical disc acting as a recording medium capable of recording a large amount of data therein. Particularly, there has been newly developed a high-density optical recording medium capable of recording/storing high-quality video data and high-quality audio data for a long period of time, for example, a Blu-ray Disc (BD).

The BD acting as the next-generation recording medium has been considered to be the next-generation optical recording solution capable of recording/storing much more data than a conventional DVD. In recent times, the international standard technical specification associated with the BD has been established along with those of other digital devices.

Although many developers have conducted intensive research into the introduction of a PAC (Physical Access Control) area in the technical standard of the BD, the technical standard for the BD has not yet been established, so that the developers have difficulty in developing the completed optical recording/reproducing apparatus.

SUMMARY OF THE INVENTION

Accordingly, the present invention is directed to a recording medium, and a method and apparatus for reformatting the recording medium that substantially obviate one or more problems due to limitations and disadvantages of the related art.

An object of the present invention is to provide a method and apparatus for recording PAC information in a recording medium, and reformatting the recording medium on a recording unit basis.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for reformatting a recording medium includes the steps of (a) reading a plurality of physical access control information of the recording medium in a plurality of recording units, and (b) performing an initialization process for each recording unit upon receiving a reformatting command associated with the plurality of recording units, wherein the initialization process is differently performed according to an attribute of information recorded in each recording unit.

In another aspect of the present invention, a method for reformatting a recording medium includes the steps of (a) recognizing type information of a PAC (Physical Access Control) cluster using PAC_ID information contained in each PAC cluster of a PAC area, (b) if the PAC_ID information is indicative of a non-primary PAC cluster, changing PAC status information and the PAC_ID information to other information during a reformatting operation, and (c) if the PAC_ID information is indicative of a primary PAC cluster, maintaining the PAC status information and the PAC_ID information during the reformatting operation.

In another aspect of the present invention, a method for reformatting a recording medium includes the steps of (a) recognizing type information of a PAC (Physical Access Control) cluster using PAC_ID information contained in each PAC cluster of a PAC area, (b) if the PAC_ID information is indicative of a non-primary PAC cluster, changing PAC status information and the PAC_ID information to other information during a reformatting operation, and initializing all information contained in the PAC cluster, and (c) if the PAC_ID information is indicative of a primary PAC cluster, maintaining the PAC status information and the PAC_ID information during the reformatting operation.

In another aspect of the present invention, an apparatus for reformatting a recording medium includes a controller for generating a request for reformatting the recording medium, and a recording/reproducing unit for reformatting the recording medium upon receiving the reformatting request from the controller, recognizing type information of a PAC cluster using PAC_ID information contained in each PAC (Physical Access Control) cluster, changing PAC status information and the PAC_ID information to other information during a reformatting operation when the PAC_ID information is indicative of a non-primary PAC cluster, and maintaining the PAC status information and the PAC_ID information without any change during the reformatting operation when the PAC_ID information is indicative of a primary PAC cluster.

In a further aspect of the present invention, an apparatus for reformatting a recording medium includes a controller for generating a request for reformatting the recording medium, and a recording/reproducing unit for reformatting the recording medium upon receiving the reformatting request from the controller, recognizing type information of a PAC cluster using PAC_ID information contained in each PAC (Physical Access Control) cluster, initializing PAC status information, the PAC_ID information, and all information contained in the PAC cluster during a reformatting operation when the PAC_ID information is indicative of a non-primary PAC cluster, and maintaining the PAC status information and the PAC_ID information without any change during the reformatting operation when the PAC_ID information is indicative of a primary PAC cluster.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Prior to describing the present invention, it should be noted that most terms disclosed in the present invention correspond to general terms well known in the art, but some terms have been selected by the applicant as necessary and will hereinafter be disclosed in the following description of the present invention. Therefore, it is preferable that the terms defined by the applicant be understood on the basis of their meanings in the present invention.

A recording medium for use in the present invention is indicative of all recordable mediums, for example, an optical disc, a magnetic disc, and a magnetic tape, etc.

For the convenience of description and better understanding of the present invention, the optical disc will hereinafter be exemplarily used as the above-mentioned recording medium in the present invention.

The term "reformatting" is indicative of a process for re-initializing recording medium format information due to a specific cause generated while the recording medium such as a re-recordable optical disc is used. Particularly, although the reformatting operation must be performed only when a reformatting allowable condition has been provided in order to protect old data recorded in the recording medium from danger, the present invention firstly assumes that the reformatting allowable condition has been provided, and will disclose a method for reformatting a specific management area (e.g., a PAC area) of the recording medium under the above assumption.

The term "PAC" is indicative of a process for controlling a physical access of a recording medium. For example, the PAC area contained in the recording medium is indicative of a specific area in which PAC-associated control information is recorded, a PAC cluster is indicative of a single recording unit contained in the PAC area, and a detailed description thereof will hereinafter be given with reference to FIGS. 1 and 2.

Figure 1:
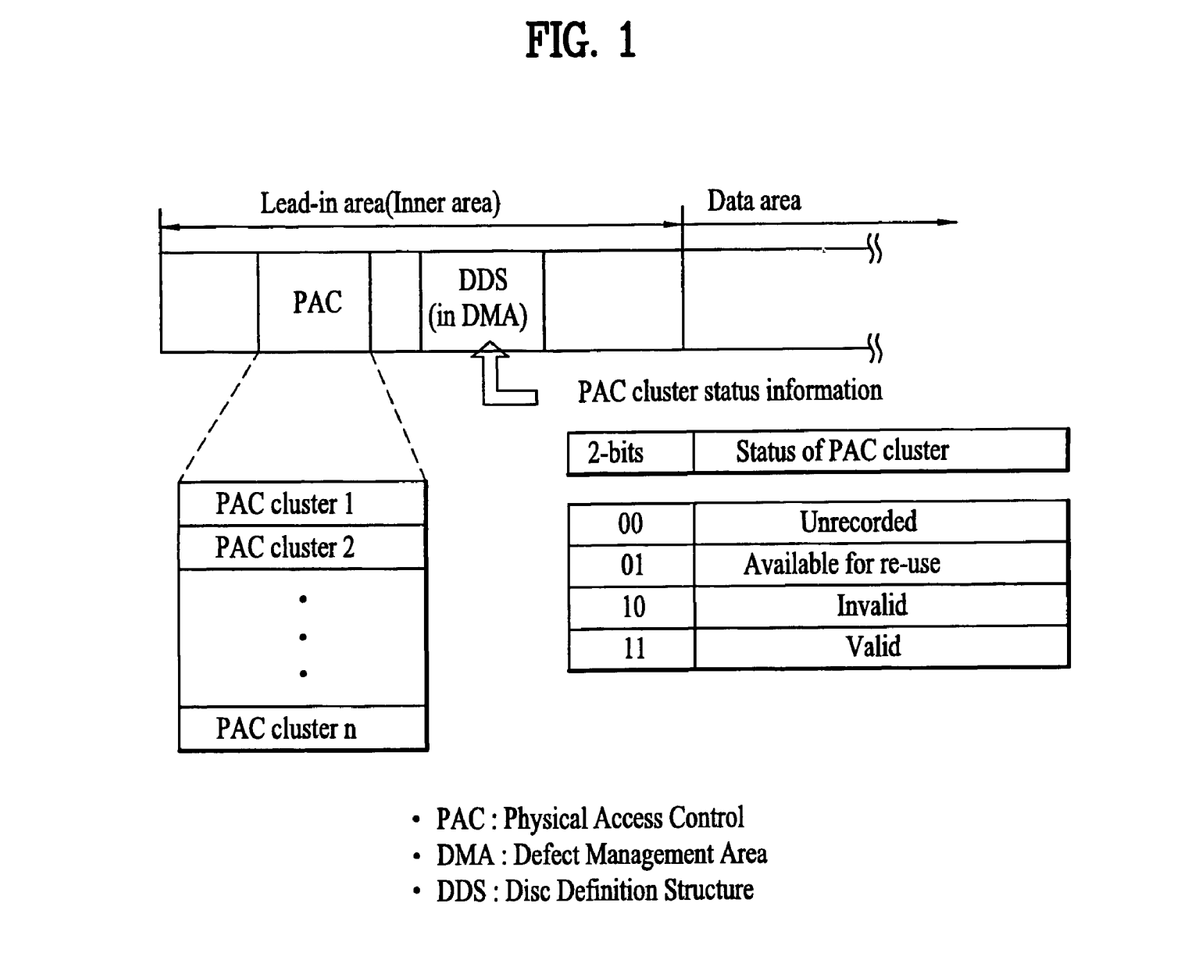
FIG. 1 shows a physical structure of a recording medium according to the present invention.

FIG. 1 shows a physical structure of a recording medium according to the present invention. For example, an optical disc serving as the recording medium includes a data area for recording user-desired data and a lead-in area for recording a variety of information capable of managing the disc. The lead-in area is contained in an inner area of the disc.

One end of the lead-in area includes a PAC area. The PAC area includes a plurality of recording units, for example, n PAC clusters (PAC cluster 1~PAC cluster n).

In other words, a single PAC cluster includes PAC information for each disc. Detailed information contained in the PAC cluster will hereinafter be described in the following description.

Although only one PAC area contained in the disc is exemplarily shown in FIG. 1, it should be noted that this example is provided for the convenience of description. For example, if the recording medium includes two PAC areas, the same information is recorded in the two PAC areas, such that information recorded in the PAC areas can be more reliably protected from danger.

Generally, the lead-in area includes a DMA (Defect Management Area) for managing a disc defect and a general management function. The DMA records a DDS (Disc Definition Structure) therein.

Status information indicative of a status of each PAC cluster contained in the above-mentioned PAC area is recorded in the DDS. For example, two bits are allocated to each PAC cluster, such that they are able to indicate status information of each PAC cluster.

For example, if status information of a PAC cluster is a predetermined number "00", this PAC cluster is indicative of an unused PAC cluster as denoted by "Unrecorded" in FIG. 1. If status information of a PAC cluster is a predetermined number "01", this PAC cluster is currently reusable even if it has been previously used, as denoted by "Available for re-use" in FIG. 1. If status information of a PAC cluster is a predetermined number "10", this PAC cluster is indicative of a specific PAC cluster in which invalid information is recorded, as denoted by "Invalid" in FIG. 1. If status information of a PAC cluster is a predetermined number "11", this PAC cluster is indicative of a specific PAC cluster in which current valid information is recorded, as denoted by "Valid" in FIG. 1.

Figure 3:
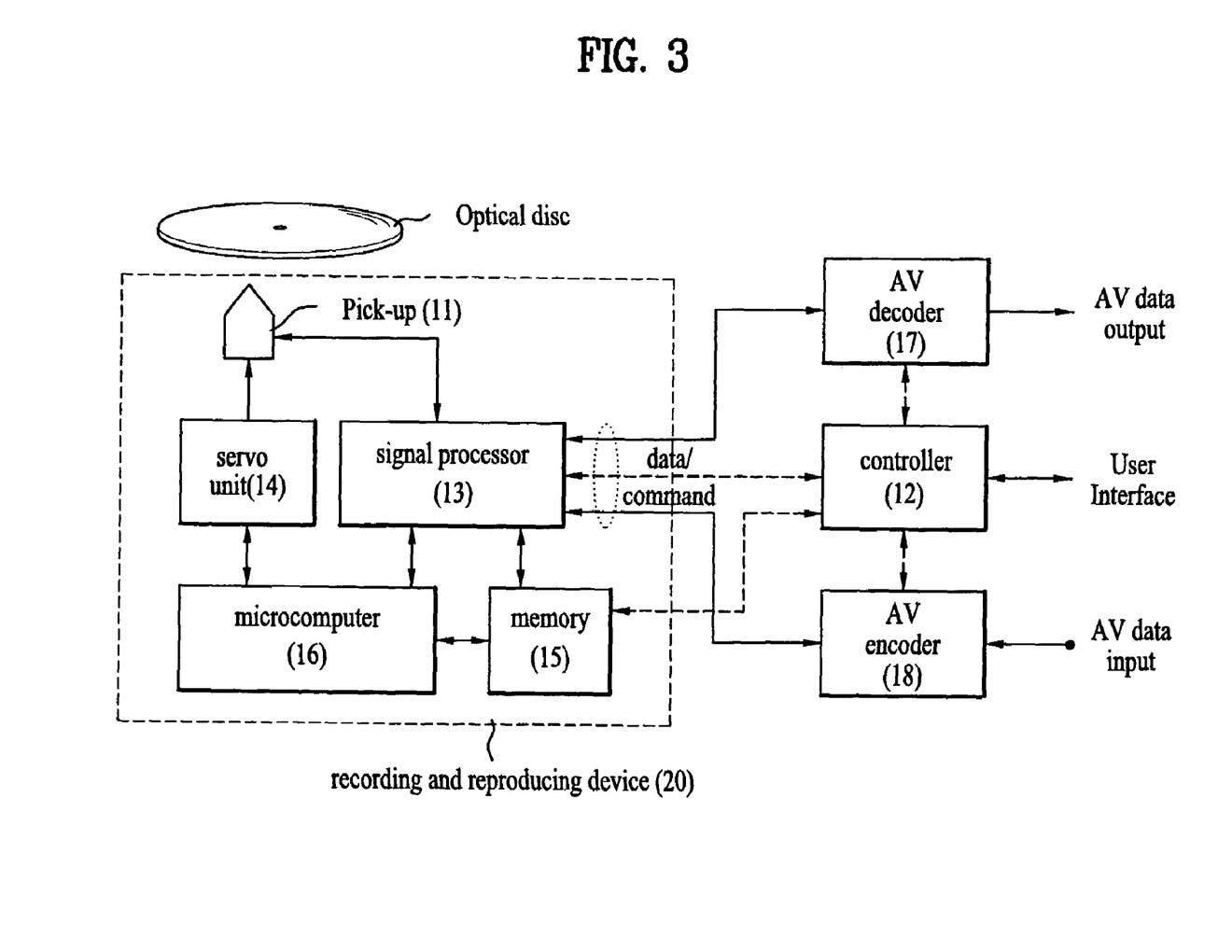
FIG. 3 is a block diagram illustrating an optical recording/reproducing apparatus according to the present invention.

Therefore, the optical recording/reproducing apparatus shown in FIG. 3 detects PAC cluster status information contained in the DDS, so that it can recognize current status information of all PAC clusters contained in each PAC area.

Figure 2:
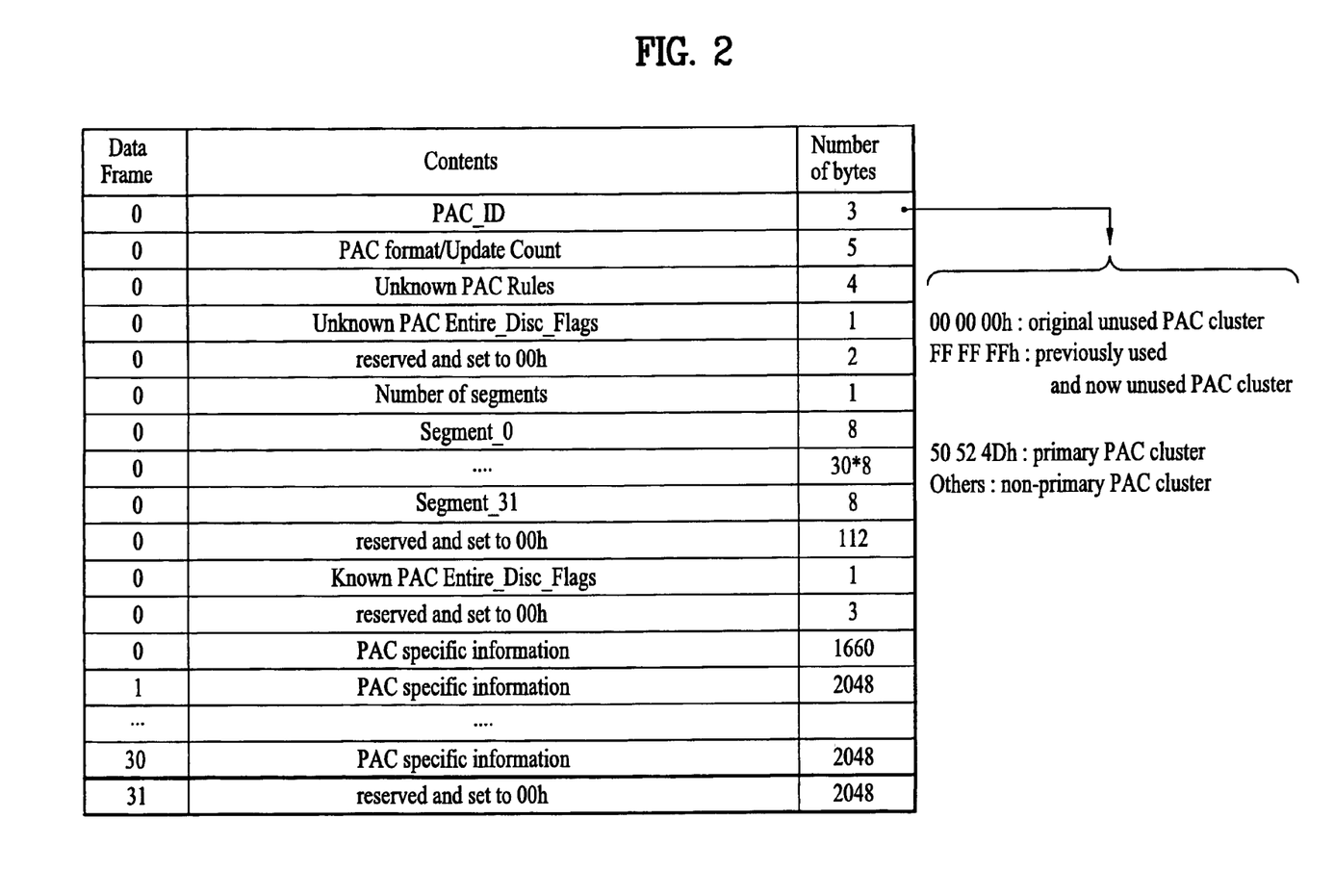
FIG. 2 shows information contained in a PAC cluster of the recording medium according to the present invention.

FIG. 2 shows information contained in a PAC cluster of the recording medium according to the present invention.

Referring to FIG. 2, one cluster acting as a recording unit includes 32 data frames. A single data frame includes data of 2048 bytes.

In more detail, some parts of a first data frame (Data Frame 0) include general information associated with a corresponding PAC cluster as PAC header information. The remaining 31 data frames (Data Frame 1~Data Frame 31), and the remaining areas other than the header information of the first data frame (Data Frame 0) include unique information of a corresponding PAC cluster. Needless to say, the last data frame (Data Frame 31) may be left as a reserved area as necessary, as shown in FIG. 2.

PAC header information recorded in some parts of the first data frame (Data Frame 0) contained in the PAC cluster is used as recognition information indicative of a corresponding PAC cluster type. The PAC header information includes a first field "PAC_ID", a second field "PAC Format" for recording format version information of the PAC cluster, and a third field "Update count" for recording the number of update times.

In the case of an optical recording/reproducing apparatus incapable of recognizing the first field "PAC_ID", the PAC header information includes a first field "Unknown PAC Rule" for recording physical access control information of the disc and a second field "Unknown PAC Entire_Disc_flags", and also includes segment information for designating a specific area of the disc controlled by the first field "Unknown PAC Rule". Particularly, the disc can include a maximum of 32 segment information units as necessary. The PAC header information includes a first field "Number of Segments" indicative of the number of segments contained in a current PAC cluster and a plurality of fields "Segment_i" (i=0~31) including position information of each segment contained in the disc.

In the case of an optical recording/reproducing apparatus capable of recognizing the field "PAC_ID", the PAC header information includes a predetermined field "Known PAC Entire_Disc_flags" capable of providing control information.

Also, a plurality of fields "PAC specific information" include unique general information of a corresponding PAC cluster and control information thereof. The above-mentioned unique general information and control information of the PAC cluster can be referred by the optical recording/reproducing apparatus recognizing the field "PAC_ID" when a disc recording/reproducing operation is performed.

Each PAC cluster has a data structure shown in FIG. 2, all bytes contained in a corresponding field from among the above-mentioned fields are determined to be "" when the corresponding field is not used. Therefore, the value of "00h" is able to designate a current unused field.

For example, if the number of segments managed by the above corresponding PAC cluster is 2, the field "Number of segments" holds a value of 2. A field "Segment_0" records a start address where a corresponding segment begins in the disc. A field "Segment_1" records an end address where the corresponding segment is ended. All bytes of the remaining fields "Segment_2"~"Segment_31" are set to the value of "00h", respectively. In this way, all bytes contained in an unused field from among a plurality of fields "PAC specific information" can be set to the value "00h", respectively.

Particularly, the field "PAC_ID" is critical to the present invention. In more detail, the present invention is characterized in that different reformatting operations are performed according to individual PAC cluster types. The above-mentioned PAC_ID information is used as specific information capable of determining type information of a corresponding PAC cluster.

The present invention largely classifies the PAC cluster into three PAC cluster types, i.e., an unused PAC cluster indicative of an unused PAC cluster, a primary PAC cluster, and a non-primary PAC cluster. In more detail, one or more primary PAC clusters must be compulsorily included in the PAC area of each disc, and the non-primary PAC cluster is not defined by the primary PAC cluster.

For example, if the PAC_ID field of 3 bytes in a specific PAC cluster is denoted by "PAC_ID=00 00 0h", this PAC cluster is indicative of an unused PAC cluster, particularly, an original unused PAC cluster. If the PAC_ID field of 3 bytes is denoted by "PAC_ID=FF FF FFh", this PAC cluster is indicative of a previously used PAC cluster, particularly, a now unused PAC cluster which was previously used, as denoted by "Previously Used and Now Unused PAC Cluster" in FIG. 2.

For example, if the PAC_ID field of 3 bytes has a specific value predetermined as the standard specification as denoted by "PAC_ID=50 52 4Dh", this PAC cluster is indicative of a primary PAC cluster. If the PAC_ID field of 3 bytes has another value different from the above-mentioned specific value, this PAC cluster is indicative of a non-primary PAC cluster.

Therefore, although the non-primary PAC cluster can be set to a variety of PAC_ID values, it must use the predetermined value determined as the standard specification. In other words, when a specific non-primary PAC cluster is standardized, a corresponding PAC_ID field is determined to be a specific value. Therefore, an optical recording/reproducing apparatus manufactured before the non-primary PAC cluster is standardized cannot recognize the PAC_ID value of the non-primary PAC cluster. In this way, if the optical recording/reproducing apparatus cannot recognize the PAC_ID field of a specific PAC cluster, a disc recording/reproducing access is controlled by a control scheme recorded in the field "Unknown Rule" contained in the PAC cluster, as described above.

A method and apparatus for reformatting a recording medium will hereinafter be described with reference to FIGS. 3~5.

FIG. 3 is a block diagram illustrating an optical recording/reproducing apparatus according to the present invention. Referring to FIG. 3, the optical recording/reproducing apparatus largely includes a recording/reproducing unit 20 and a controller 12.

The recording/reproducing unit 20 includes an optical pickup unit 11 for reading data and management information recorded in an optical disc; a servo unit 14 for controlling the optical pickup unit 11; a signal processor 14 for restoring a reproduction signal received from the optical pickup unit 11 to a desired signal value, or modulating a signal to be recorded into a signal recorded in the optical disc, such that it transmits the restored or modulated result to the optical pickup unit 11; a memory 15 for temporarily storing the management information read from the optical disc; and a microprocessor 16 for controlling the above-mentioned operations. Particularly, a manufactured product composed of only the recording/reproducing unit 20 is called a drive.

The controller 12 is adapted to control overall operations of the optical recording/reproducing apparatus, receives a command from a user by interfacing with the user, and transmits the received command to the microprocessor 16 contained in the recording/reproducing unit 20, such that it allows the optical recording/reproducing apparatus to perform operations associated with the user command. Particularly, the controller 12 generates a recording/reproducing command using disc management information received from the recording/reproducing unit 20, and then transmits the recording/reproducing command to the recording/reproducing unit 20.

In association with the above-mentioned operations, an AV (Audio/Video) decoder 17 finally decodes output data upon receiving a control signal from the controller 12, and transmits the decoded output data to the user. An AV encoder 18 converts an input signal into a specific format signal such as an MPEG2 transport stream) upon receiving a control signal from the controller 12, and transmits the specific format signal to the signal processor 13 contained in the recording/reproducing unit 20, such that a desired signal can be recorded in the optical disc.

In the above-mentioned optical recording/reproducing apparatus, reformatting operations according to the present invention will hereinafter be described with reference to FIGS. 4 and 5.

Upon receiving a command from a user, the controller 12 transmits a disc reformatting command to the recording/reproducing unit 20. The reformatting command is allowable under a strict condition to protect data stored in a disc from danger. It should be noted that the present invention assumes that the disc is capable of allowing the execution of the reformatting command. The recording/reproducing unit 20 having received from the reformatting command performs operations shown in FIGS. 4 and 5 while reformatting the PAC area associated with the present invention.

Figure 4:
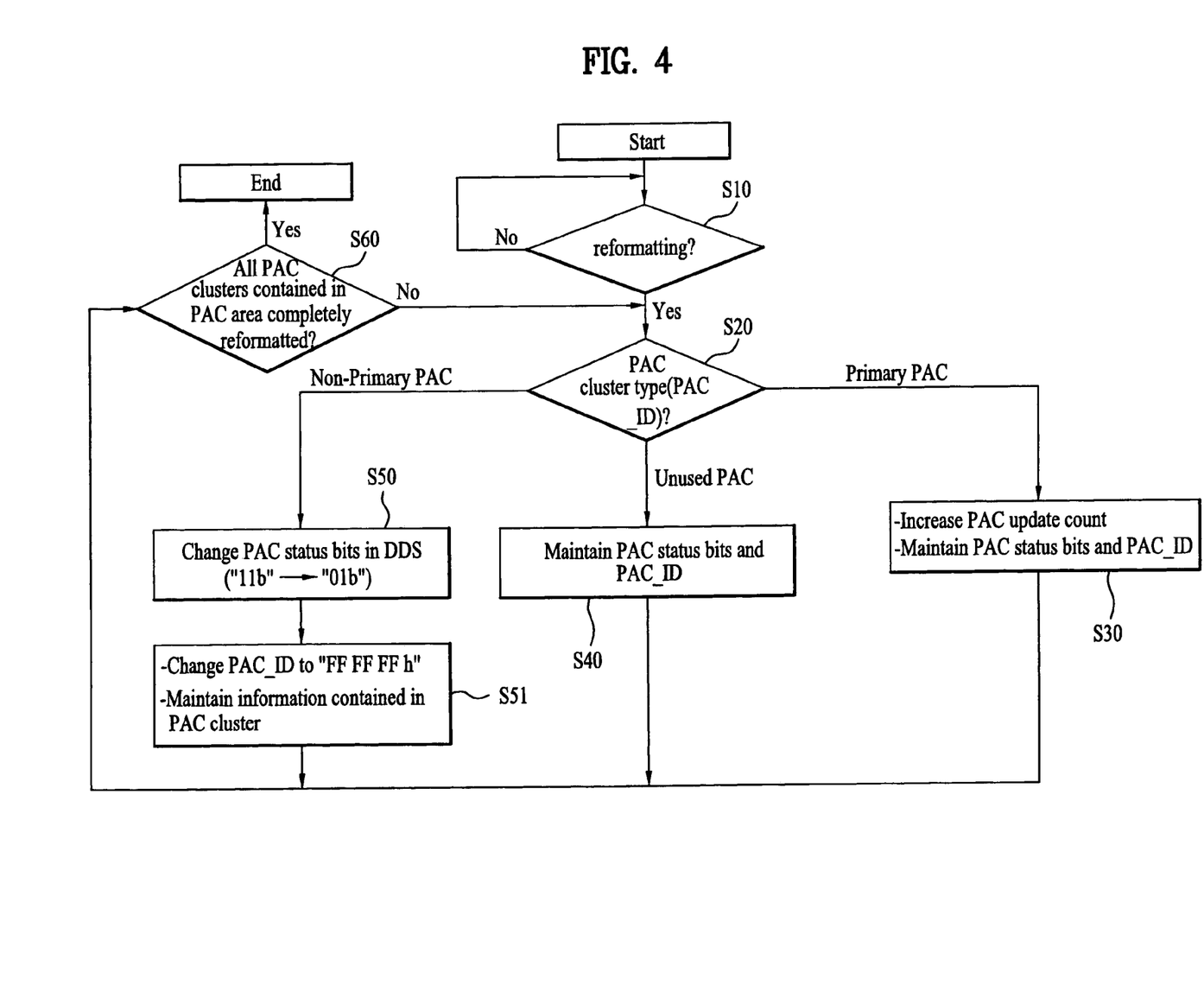
FIGS. 4 and 5 are flow charts illustrating a method for reformatting the recording medium according to the present invention.

FIG. 4 is a flow chart illustrating a method for reformatting the PAC area in accordance with a preferred embodiment of the present invention.

Referring to FIG. 4, during the reformatting operation, the recording/reproducing unit 20 recognizes type information of a PAC cluster using the PAC_ID information of the PAC cluster. If the PAC_ID information is indicative of a non-primary PAC cluster, the recording/reproducing unit 20 changes the PAC status information and the PAC_ID information to other information. Otherwise, if the PAC_ID information is indicative of a primary PAC cluster, the recording/reproducing unit 20 maintains the PAC status information and the PAC_ID information without any change.

In more detail, if the recording/reproducing unit 20 receives the reformatting command at step S10, it recognizes type information of each PAC cluster contained in the PAC area using the PAC_ID information at step S20.

If type information of a PAC cluster is indicative of a primary PAC cluster as denoted by "PAC_ID=50 52 4Dh" in FIG. 2 at step S20, the primary PAC cluster is indicative of a PAC cluster which must remain after the reformatting operation has been performed. Therefore, the recording/reproducing unit 20 must continuously maintain the PAC status information and the PAC_ID information recorded in the DDS without any change at step S30. But, it should be noted that the number of update times stored in the field "Update Count" contained in the PAC cluster is increased by a predetermined number of 1 at step S30.

If type information of a PAC cluster is determined to be an unused PAC cluster as denoted by "PAC_ID=00 00 00h" or "PAC_ID=FF FF FFh" in FIG. 2 at step S20, the PAC cluster must remain after the reformatting operation has been performed. Therefore, the recording/reproducing unit 20 must continuously maintain the PAC status information and the PAC_ID information without any change at step S30.

If type information of a PAC cluster is indicative of a specific non-primary PAC cluster at step S20, the PAC cluster must be changed to an unused PAC cluster during the reformatting operation. Therefore, the PAC status information indicative of a status of a corresponding PAC cluster contained in the DDS is changed from first data (e.g., "11b") indicative of a valid status to second data (e.g., "01b") indicative of an available for re-use status at step S50. Also, the PAC_ID field contained in the PAC cluster must be changed to specific information denoted by "PAC_ID=FF FF FFh" indicative of an unused PAC cluster at step S51. In this case, there is no need to initialize all information stored in the PAC cluster, and the reformatting operation is finished on the condition that the PAC status information and the PAC_ID information are changed to other information at step S51.

The above-mentioned steps S20~S51 are repeated until reaching all PAC clusters contained in the PAC area at step S60. If the above-mentioned steps S20~S51 are finished for every PAC cluster type, the reformatting operation for the PAC area is also finished.

Figure 5:
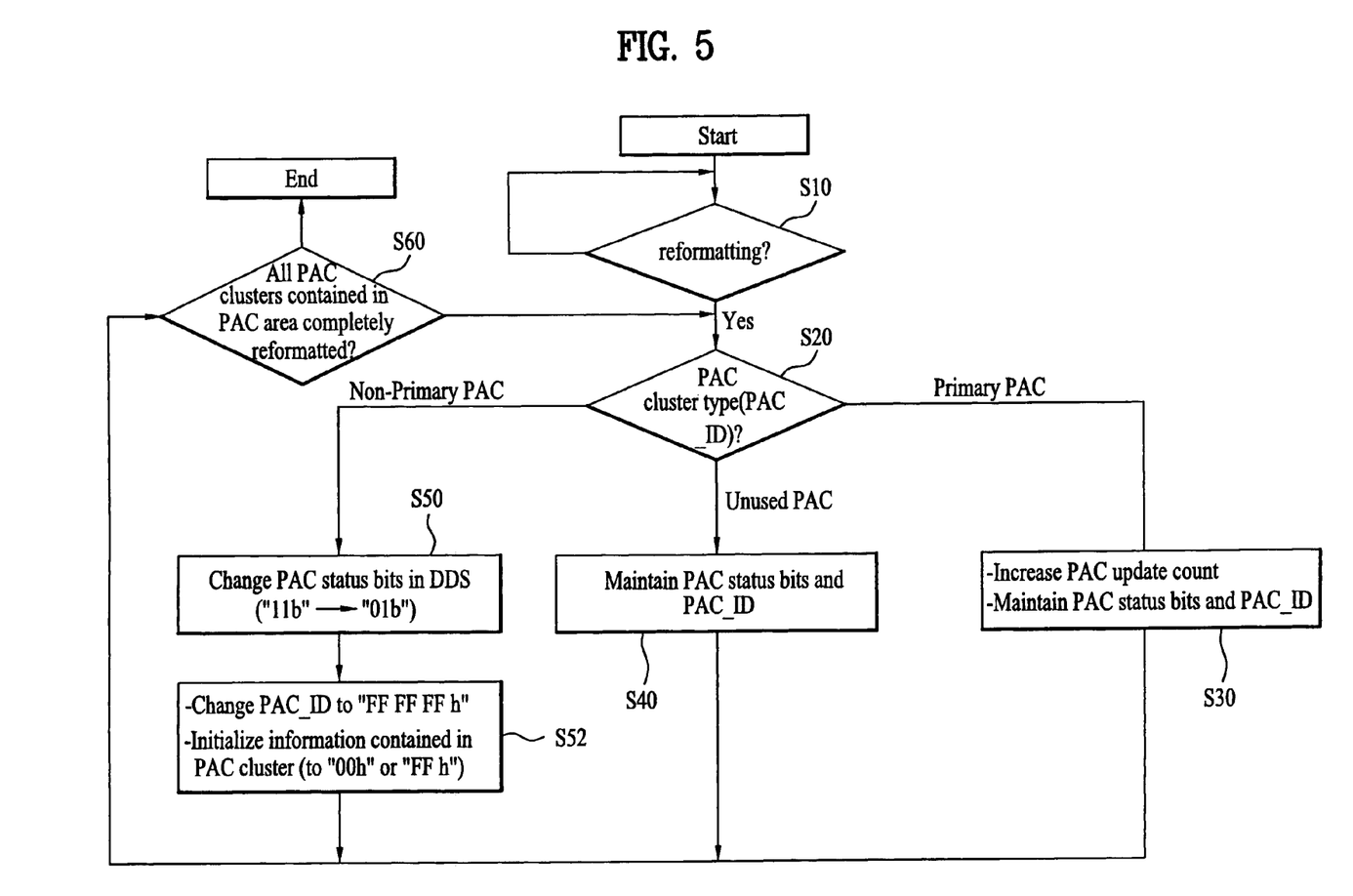

FIG. 5 is a flow chart illustrating a method for reformatting the PAC area in accordance with another preferred embodiment of the present invention.

Referring to FIG. 5, during the reformatting operation, the recording/reproducing unit 20 recognizes type information of a PAC cluster using the PAC_ID information of the PAC cluster. If the PAC_ID information is indicative of a non-primary PAC cluster, the recording/reproducing unit 20 initializes the PAC status information and the PAC_ID information. Otherwise, if the PAC_ID information is indicative of a primary PAC cluster, the recording/reproducing unit 20 maintains the PAC status information and the PAC_ID information without any change.

In other words, according to the second preferred embodiment shown in FIG. 5, during the reformatting operation of the non-primary PAC cluster, all information contained in the non-primary PAC cluster is initialized to the value of "00h" or "FFh", differently from the first preferred embodiment shown in FIG. 4.

As apparent from the above description, a method and apparatus for reformatting a recording medium according to the present invention can efficiently reformat a specific management area contained in the recording medium.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for formatting a recording medium comprising: read from the recording medium a plurality of access control information for controlling an access of a recording/reproducing apparatus to the recording medium and for enlarging a compatibility of the recording medium with the recording/reproducing apparatus by recording/reproducing data based on a predetermined rule in the access control information if the access control information is not identified by the recording/reproducing apparatus; and performing a formatting process for each access control information, wherein the formatting process is differently performed according to type of the access control information, and wherein if the access control information is a non-primary access control information, status information and identification information of the non-primary access control information are changed during the formatting process and if the access control information is a primary access control information, status information and identification information of the primary access control information are maintained.

2. The method of claim 1, wherein the access control information are recorded in inner area of the recording medium.

3. The method of claim 1, wherein the access control information is recorded in a recording unit.

4. The method of claim 1, wherein an update count of the primary access control information is increased according to the formatting process.

5. The method of claim 1, wherein a plurality of the status information for the non-primary access control information is changed into a status information indicating reusable status.

6. The method of claim 1, wherein the identification (ID) information for the non-primary access control information is changed to indicate reusable unused access control information.

7. The method of claim 1, wherein the formatting process is performed for all of the access control information of the recording medium.

8. A method for reformatting a recording medium comprising:

recognizing type of access control information using identifying information contained in each access control information, the access control information controlling an access of a recording/reproducing apparatus to the recording medium and enlarging a compatibility of the recording medium with the recording/reproducing apparatus by recording/reproducing data based on a predetermined rule in the access control information if the access control information is not identified by the recording/reproducing apparatus;

if the identifying information is indicative of a non-primary access control information, changing status information and the identifying information of the non-primary access control information during a reformatting operation; and if the identifying information is indicative of a primary access control information, maintaining the status information and/or the identifying information during the reformatting operation.

9. The method of claim 8, wherein the status information is changed to indicate a reusable status of the access control information, if the identifying information is indicative of a non-primary access control information.

10. The method of claim 8, wherein the identifying information is changed to indicate a reusable unused access control information, the identifying information is indicative of a non-primary access control information.

11. The method of claim 8, futher comprising:

if the identifying information is indicative of the non-primary access control information during the reformatting operation, initializing all information contained in the access control information to a predetermined initialization value.

12. An apparatus for fomatting a recording medium comprising: an optical pickup configured to record/reproduce data on/from the recording medium; and a controller configured to control the optical pickup to read from the recording medium access control information for controlling an access of the optical pickup to the recording medium and for enlarging a compatiblility of the recording medium by recording/reproducing data based on a predetermined rule in the access control information if the access control information is not identified by the controller, and the controller configured to differently change each of the access control information according to type of access control information during a formatting operation, and wherein if the access control information is a non-primary access control information, status information and identification information of the non-primary access control information are changed during the formatiing process and if the access control information is a primary access control information, status information and identification information of the primary access control information are maintained.

13. The apparatus of claim 12, wherein the controller is configured to control the optical pickup to change status information of the access control information to indicate a reusable status, if the read access control information is non-primary access control information.

14. The apparatus of claim 12, wherein the controller is configured to control the optical pickup to change identification (ID) information of the access control information to indicate reusable unused access control information, if the read access control information is non-primary access control information.

15. The apparatus of claim 12, wherein the controller is configured to control the optical pickup to initialize all information contained in the access control information to a predetermined initialization value, if the read access control information in non-primary access control information.

16. A recording medium comprising:

an access control information area for storing a plurality of access control information units for controlling an access of a recording/reproducing apparatus to the recording medium and for enlarging a compatibility of the recording medium by recording/reproducing data based on a predetermined rule in the access control information if the access control information is not identified by the recording/reproducing apparatus, and a status information area for storing status information of each access control information unit stored in the access control information area, wherein the access control information units are differently changed according to the type of the access control information unit during a formatting operation.

17. The recording medium of claim 16, wherein each of the access control information units include identification (ID) information to indicate a type of the corresponding access control information unit.

18. The recording medium of claim 16, wherein the access control information area inlcudes first and second access control information units, the first access control information unit being updated according to formatting of the recording medium and the second access control information unit being changed to reusable access control information unit according to formatting of the recording medium.

19. The recording medium of claim 18, wherein the status information of the first access control information unit is maintained and the status information of the second access control information unit is changed.

20. The recording medium of claim 19, wherein the changed status information of the second access control information unit indicates a reusable status of the second access control information unit.

21. The recording medium of claim 18, wherein each of the first and second access control information units include identification (ID) information for indicating the type of the corresponding access control information unit, and wherein only the identification (ID) information of the second access control information unit is changed.

22. The recording medium of claim 21, wherein a value of the changed identification (ID) information of the second access control information unit is 00h or FFh.

23. A recording medium, comprising: a first access control information area for storing first access control information, the first access control information being updated according to formatting of the recording medium, and a second access control information area for storing second access control information, the second access control information including status information for indicating a reusable status of the second access control information according to formatting of the recording medium, wherein each of the first and second access control information controls an access of a recording/reproducing apparatus to the recording medium and enlarges a reproduction compatibility of the recording medium by recording/reproducing data based on a predetermined rule in the access control information if the access control information are not identified by the recording/reproducing apparatus, and wherein if the access control information is a non-primary access control information, status information and identification information of the non-primary access control information are changed during the formatting process and if the access control information is a primary access control information, status information and identification information of the primary access control information are maintained.

24. The recording medium of claim 23, wherein the first access control information includes update count indicating a number of update times.

25. An apparatus for reformatting a recording medium comprising:

a controller configured to recognize a type of access control information in the recording medium by using identfying information included in each access control information, the access control information controlling an access of a recording/reproducing apparatus to the recording medium and enlarging a compatibility of the recording medium with the recording/reproducing apparatus by recording/reproducing data based on a predetermined rule in the access control information if the access control information is not identified by the recording/reproducing apparatus, the access control information further including status information for indicating a status of the corresponding access control information; and a recording/reproducing unit configured to perform a reformatting operation according to a reformatting request from the controller, wherein the recording/reproducing unit is configured to change the identifying information and status information of the corresponding access control information in response to the reformatting operation if the identifying information indicates a non-primary access control information, and alternatively, maintain the identifying information and/or the status information in response to the reformatting operation if the identifying information indicates a primary access control information.

26. The recording medium of claim 25, wherein the first access control information includes update count indicating a number of update times.

27. An apparatus for reformatting a recording medium comprising:

a controller configured to recognize a type of access control information in the recording medium by using identifying information included in each access control information, the access control information controlling an access of a recording/reproducing apparatus to the recording medium and enlarging a compatibility of the recording medium with the recording/reproducing apparatus by recording/reproducing data based on a predetermined rule in the access control information if the access control information is not identified by the recording/reproducing apparatus, the access control information further including status information for indicating a status of the corresponding access control information; and a recording/reproducing unit configured to perform a reformatting operation according to a reformatting request from the controller, wherein the recording/reproducing unit is configured to change the identifying information and status information of the corresponding access control information in response to the reformatting operation if the identifying information indicates a non-primary access control information, and alternatively, maintain the identifying information and/or the status information in response to the reformatting operation if the identifying information indicates a primary access control information.

* * * * *